(12) United States Patent
Desmond et al.

(10) Patent No.: US 11,379,718 B2
(45) Date of Patent: Jul. 5, 2022

(54) GROUND TRUTH QUALITY FOR MACHINE LEARNING MODELS

(71) Applicant: International Business Machines Corporation, Armonk, NY (US)

(72) Inventors: Michael Desmond, White Plains, NY (US); Matthew Arnold, Ridgefield Park, NJ (US); Jeffrey Scott Boston, Wappingers Falls, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 456 days.

(21) Appl. No.: 16/708,792

(22) Filed: Dec. 10, 2019

(65) Prior Publication Data

US 2021/0174196 A1 Jun. 10, 2021

(51) Int. Cl.
| | | |
|---|---|---|
| *G06K 9/00* | (2022.01) | |
| *G06N 3/08* | (2006.01) | |
| *G06N 3/04* | (2006.01) | |
| *G06K 9/62* | (2022.01) | |

(52) U.S. Cl.
CPC ............. *G06N 3/08* (2013.01); *G06K 9/6221* (2013.01); *G06K 9/6263* (2013.01); *G06K 9/6284* (2013.01); *G06N 3/04* (2013.01)

(58) Field of Classification Search
CPC ............ G06N 3/08; G06N 3/04; G06N 5/003; G06N 20/00; G06K 9/6221; G06K 9/6263; G06K 9/6284; G06K 9/6218
See application file for complete search history.

(56) References Cited

U.S. PATENT DOCUMENTS

| | | | |
|---|---|---|---|
| 2015/0254555 A1* | 9/2015 | Williams, Jr. | ......... G06N 3/084 706/14 |
| 2016/0155069 A1 | 6/2016 | Hoover et al. | |
| 2017/0082555 A1* | 3/2017 | He | ...................... G01N 21/9501 |
| 2017/0154280 A1* | 6/2017 | Adir | ....................... G06N 20/00 |

(Continued)

OTHER PUBLICATIONS

Anonymous, "Ranking and automatic selection of machine learning models," IP.com Prior Art Database Techinical Disclosure, IP.com No. IPCOM000252275D, Jan. 3, 2018, 34 pages.

(Continued)

*Primary Examiner* — Ping Y Hsieh
(74) *Attorney, Agent, or Firm* — Cantor Colburn LLP; Stosch Sabo

(57) ABSTRACT

Methods, systems and computer program products for improving ground truth quality for modeling are provided. Aspects include receiving a plurality of data inputs, wherein each of the plurality of data inputs has an associated label. Aspects also include training a model based on the plurality of data inputs. Aspects also include generating a plurality of vector representations corresponding to the plurality of data inputs based on the model. Aspects also include clustering the plurality of vector representations into one or more clusters. Aspects also include identifying at least one anomalous data input based on the one or more clusters. The at least one anomalous data input can be a data input of the plurality of data inputs that is mislabeled, contributes to an ambiguous class structure or is an outlier. Aspects also include outputting a notification that provides an indication of the at least one anomalous data input.

20 Claims, 10 Drawing Sheets

(56) References Cited

U.S. PATENT DOCUMENTS

| | | | |
|---|---|---|---|
| 2017/0169354 A1 | 6/2017 | Diamanti et al. | |
| 2018/0082211 A1 | 3/2018 | Allen et al. | |
| 2018/0314971 A1 | 11/2018 | Chen et al. | |
| 2018/0358001 A1* | 12/2018 | Amid | G06F 16/3329 |
| 2019/0102683 A1 | 4/2019 | Jayaraman et al. | |
| 2019/0188212 A1* | 6/2019 | Miller | G06N 20/00 |
| 2019/0188574 A1* | 6/2019 | Menon | G06N 5/006 |

OTHER PUBLICATIONS

Li et al., "Resolving conflicts in heterogeneous data by truth discovery and source reliability estimation," Proceedings of the ACM SIGMOD International Conference on Management of Data, Jun. 2014, 12 pages.

List of IBM Patents or Patent Applications Treated as Related; Date Filed: Dec. 10, 2019, 2 pages.

Liu et al., "Towards Better Analysis of Machine Learning Models; A Visual Analytics Perspective," Elsevier, Visual Informatics 1, 2017, pp. 48-56.

Mell et al., "The Nist Definition of Cloud Computing," National Institute of Standards and Technology, Information Technology Labratory, Sep. 2011, pp. 1-7.

Sun et al., "Label-and-Learn: Visualizing the Likelihood of Machine Learning Classifier's Success During Data Labeling," IUI 2017, Proceedings of the 22nd International Conference on Intelligent User Interfaces, Interactive Machine Learning and Explanation, Mar. 13-16, 2017, pp. 523-524.

\* cited by examiner

GROUND TRUTH QUALITY FOR MACHINE LEARNING MODELS

BACKGROUND

The present invention generally relates to computer processing systems, and more specifically, to computer processing systems configured to improve ground truth quality for generating accurate machine learning models.

Ground truth or "training examples" refer to a set of labeled examples that are used to train a machine learning (or neural network) system such as a text or image classifier. For instance, in one example, ground truth data may refer to a set of images of animals, where each image is labeled (e.g., "cat," "dog," or the like) and used to train a machine learning model that, once trained, operates to identify an animal depicted in a newly submitted image. Ground truth quality describes the overall utility and coherence of the training data and quality measures can include label noise (i.e., mislabeled data inputs), ambiguous class structures (i.e., data inputs that span multiple classes) and outliers (i.e., rare or unusual data inputs).

SUMMARY

Embodiments of the present invention are directed to methods, systems, and computer program products for improving ground truth quality for generating accurate machine learning models. A non-limiting example computer-implemented method includes receiving a plurality of data inputs. Each of the plurality of data inputs has an associated label. The method also includes training a model based on the plurality of data inputs. The method also includes generating a plurality of vector representations based on the model. Each of the plurality of vector representations corresponds to a unique one of the plurality of data inputs. The method also includes clustering the plurality of vector representations into one or more clusters. The method also includes identifying at least one anomalous data input based on the one or more clusters. The at least one anomalous data input can be a data input of the plurality of data inputs that is mislabeled, contributes to an ambiguous class structure or is an outlier. The method also includes outputting a notification that provides an indication of the at least one anomalous data input. Advantages can include the development of more accurate machine learning models while reducing the development time of such models.

In addition to one or more of the features described above or below, or as an alternative, further embodiments may include that each of the plurality of data inputs is an image. Advantages can also include development of more accurate image classification models.

In addition to one or more of the features described above or below, or as an alternative, further embodiments may include that the model is trained using a neural network and each of the plurality of vector representations corresponds to a final activation layer of the neural network. Advantages can also include the development of more accurate machine learning models while reducing the development time of such models.

In addition to one or more of the features described above or below, or as an alternative, further embodiments may include that the model is trained using a classification method and each of the plurality of vector representations corresponds to a confidence vector. Advantages can also include the development of more accurate machine learning models while reducing the development time of such models.

In addition to one or more of the features described above or below, or as an alternative, further embodiments may include that clustering the plurality of vector representations into one or more clusters includes performing a density clustering of the plurality of vector representations. Advantages can also include the development of more accurate machine learning models while reducing the development time of such models In addition to one or more of the features described above or below, or as an alternative, further embodiments may include that clustering the plurality of vector representations into one or more clusters includes performing a partitioning of the plurality of vector representations. Advantages can also include the development of more accurate machine learning models while reducing the development time of such models.

In addition to one or more of the features described above or below, or as an alternative, further embodiments may include forming a new plurality of data inputs by removing the at least one anomalous data input from the plurality of data inputs and automatically retraining the model based on the new plurality of data inputs. Advantages can also include the automatic development of more accurate machine learning models while reducing the development time of such models.

In addition to one or more of the features described above or below, or as an alternative, further embodiments may include utilizing the retrained model to classify one or more test data inputs. Advantages can also include the development of more accurate machine learning models while reducing the development time of such models.

In addition to one or more of the features described above or below, or as an alternative, further embodiments may include forming a new plurality of data inputs by removing the at least one anomalous data input from the plurality of data inputs and automatically retraining the model based on the new plurality of data inputs. Advantages can also include the development of more accurate ground truth data classification for use in the automatic retraining of a machine learning model.

In addition to one or more of the features described above or below, or as an alternative, further embodiments may include that identifying the at least one anomalous data input includes, for each cluster of the one or more clusters: identifying at least a first group of vector representations corresponding to a first classification type and a second group of vector representations corresponding to a second classification type, determining that a total number of vector representations of the second group of vector representations is less than a predetermined percentage of a total number of vector representations in the cluster and determining that each of the second group of vector representations is mislabeled. Advantages can also include the development of more accurate ground truth data classification for use in the automatic retraining of a machine learning model.

In addition to one or more of the features described above or below, or as an alternative, further embodiments may include that identifying the at least one anomalous data input includes: for each cluster of the one or more clusters, identifying a first number of vector representations with the cluster that correspond to a first classification type and a second number of vector representations within the cluster that correspond to a second classification type, determining a distribution of vector representations of the first classification type and of the second classification type among the one or more clusters, and responsive to determining that the distribution does not meet a predetermined level of homogeneity, determining that the plurality of data inputs has an ambiguous class structure in relation to the first classification type and the second classification type. The notification provides an indication of the ambiguous class structure. Advantages can also include the development of more accurate ground truth data classification for use in the automatic retraining of a machine learning model.

A non-limiting example computer-implemented method for automatically improving ground truth quality for modeling includes receiving a plurality of data inputs. Each of the plurality of data inputs has an associated label. The method also includes training a model based on the plurality of data inputs. The method also includes generating a plurality of vector representations based on the model. Each of the plurality of vector representations corresponds to a unique one of the plurality of data inputs. The method also includes clustering the plurality of vector representations into one or more clusters using a density clustering algorithm. The method also includes analyzing a vector space that includes the one or more clusters to identify at least one vector representation corresponding to an outlier data input and/or a mislabeled data input. The method also includes forming a new plurality of data inputs having associated labels by removing the outlier data input from the plurality of data inputs in response to identifying an outlier data input and relabeling the data input to have an associated label of a classification type of the predominant classification type of the vector representations in the same cluster as the vector representation corresponding to the mislabeled data input in response to identifying a mislabeled data input. The method also includes automatically retraining the model based on the new plurality of data inputs. Advantages can include the development of more accurate machine learning models while reducing the development time of such models Other embodiments of the present invention implement features of the above-described methods in computer systems and computer program products.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

Figure 1:
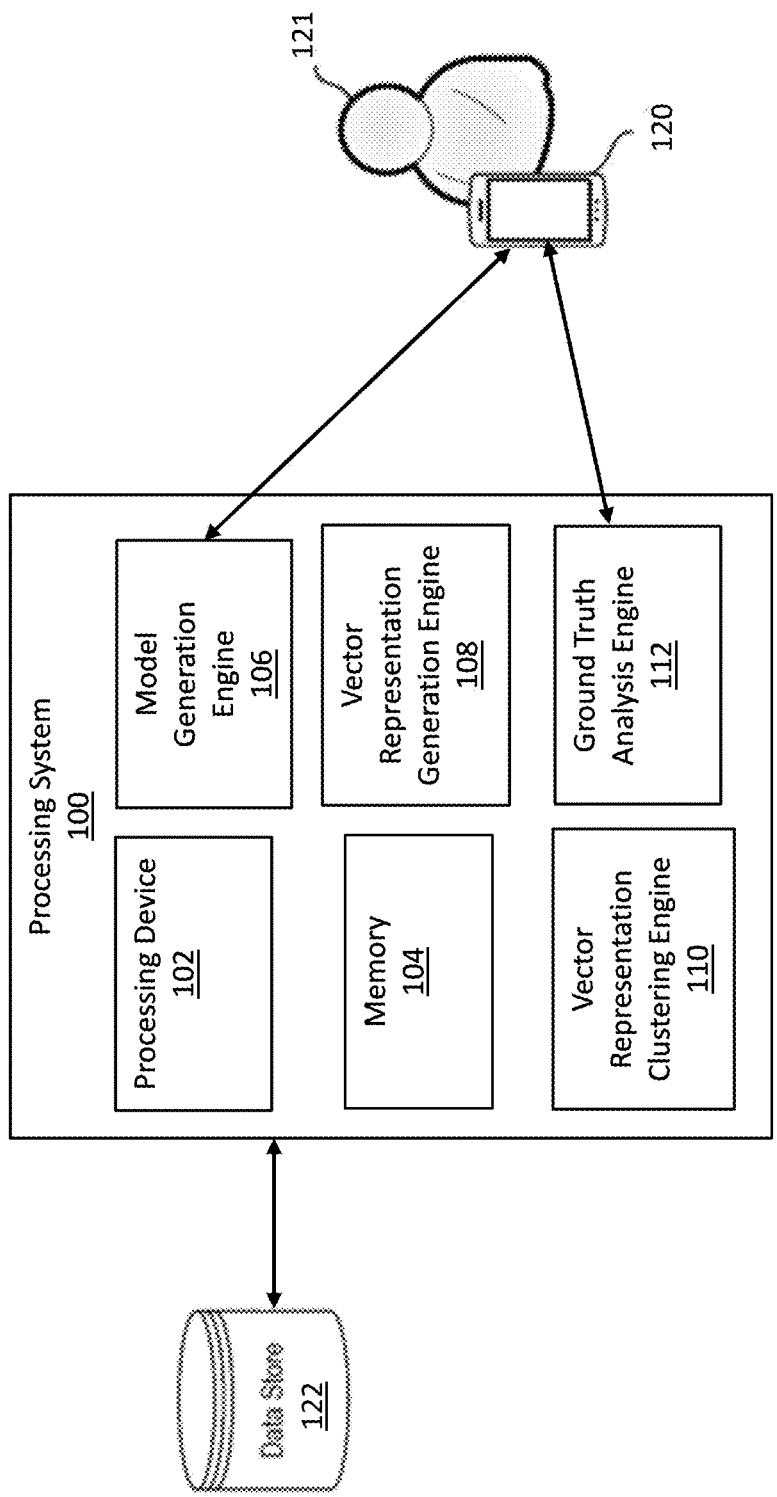
FIG. 1 depicts a system upon which improving ground truth quality for modeling may be implemented according to one or more embodiments of the present invention.

The diagrams depicted herein are illustrative. There can be many variations to the diagrams or the operations described therein without departing from the spirit of the invention. For instance, the actions can be performed in a differing order or actions can be added, deleted or modified. Also, the term "coupled" and variations thereof describes having a communications path between two elements and does not imply a direct connection between the elements with no intervening elements/connections between them. All of these variations are considered a part of the specification.

DETAILED DESCRIPTION

Ground truth data refers to labeled example data that is used to train a machine learning model to perform an intended function, such as classifying an image. The quality of ground truth data is of primary concern during the machine learning development process, as low quality ground truth data can negatively affect the accuracy of the trained model. Generally speaking, during a supervised learning process, a machine learning model can receive the labeled example data as inputs and "learn" how to perform the desired function over time. Generally speaking, the more training data that is used to train a machine learning model, the more accurate that model will be. However, the caveat to this principle is that it assumes that the ground truth data is "good data" to begin with. For example, if the machine learning model is intended to receive images of animals and identify an animal in each image, the ground truth data will include a plurality of images of animals that have been pre-labeled, for example, by a human. However, if the human mislabels any of the data (e.g., accidentally labels an image of a dog as being an image of a cat), then this mislabeled data can have a negative impact on the accuracy of the trained model as it will negatively impact the training. Further, the ground truth data may include other problems that can negatively impact the accuracy of a model trained using the ground truth data, such as ambiguous class structures and outliers. "Classes" refer to the different types of labels that may be applied to an image. For example, if all of the images of a set of ground truth data are labeled one of "dog", "cat", "pig", "horse" or "chicken", then it can be said that there are 5 classes or types of classifications. However, if a class structure includes classification types that are very similar such as to be difficult to distinguish (e.g., "pig" vs. "hog") based on the given input data type (e.g., images), this can lead to an inaccurate model. Further, outliers can be instances of training data that do not meet any of the predetermined classification types (e.g., an image of a "snake" in the previous example having 5 classification types) or that do meet a predetermined classification type but are so few in number so as to not allow for an effective training with respect to that classification type. Quality control of ground truth data is conventionally performed manually by human review of labeling, which may be performed in response to generated models that appear to be generating inaccurate classification results. This can be a very time consuming process and instances of problematic ground truth data examples may nonetheless go unnoticed and continue to negatively impact the accuracy of the trained model. Some prior approaches include methods to find conflicts in heterogeneous data from multiple sources by using a joint optimization framework and conflict detection and resolution in a modular conversation systems using conflicting predictions between modular intent classifiers, but these systems do not detect training conflicts via unsupervised clustering of vector representations of the data inputs.

Turning now to an overview of the aspects of the invention, one or more embodiments of the invention address the above-described shortcomings of the prior art by providing techniques for improving ground truth quality for generating accurate machine learning models that involve forming vector representations of each example of training set data for a particular model, clustering the vector representations, and analyzing the clusters within the vector space to identify anomalies to be corrected. Using the techniques described herein, potentially problematic issues with the ground truth data such as mislabeled examples, outliers and ambiguous class structures can be automatically identified and rectified by modifying the labels on the data and/or removing selected examples from the training data and retraining the model based on the revised ground truth data. In this way, more accurate machine learning models can be built while reducing the amount of time and effort put into model development by a developer. Further, the techniques described herein can identify problematic ground truth data that can otherwise go unnoticed by a developer.

Turning now to a more detailed description of aspects of the present invention, FIG. 1 depicts a system 100 for improving ground truth quality for generating accurate machine learning models in accordance with one or more embodiments of the present invention. The various components, modules, engines, etc. described regarding FIG. 1 can be implemented as instructions stored on a computer-readable storage medium, as hardware modules, as special-purpose hardware (e.g., application specific hardware, application specific integrated circuits (ASICs), application specific special processors (ASSPs), field programmable gate arrays (FPGAs), as embedded controllers, hardwired circuitry, etc.), or as some combination or combinations of these. According to aspects of the present disclosure, the engine(s) described herein can be a combination of hardware and programming. The programming can be processor executable instructions stored on a tangible memory, and the hardware can include the processing device 102 for executing those instructions. Thus a system memory (e.g., memory 104) can store program instructions that when executed by the processing device 102 implement the engines described herein. Other engines can also be utilized to include other features and functionality described in other examples herein.

The processing system 100 includes the processing device 102, the memory 104, a model generation engine 106, a vector representation generation engine 108, a vector representation clustering engine 110 and a ground truth analysis engine 112. According to some embodiments, processing system 100 can be any suitable computing device or collection of computing devices that are sufficient to perform the functionalities described herein. The processing system 100 can be configured to communicate with a user device 120, which can display notifications and/or data to and receive user inputs from a user 121. In some embodiments, user device 120 can be used to interface with the processing system 100 to add, delete, or modify ground truth data that can be stored by processing system 100 or data store 122. According to some embodiments, ground truth data can include data inputs and labels associated with data inputs. For example, data inputs can include labeled images, text, records, logs, observations, speech, scans or any other type of data that can be coherently translated into an N-dimensional vector.

According to some embodiments, the processing system 100 can communicate with user device 120 and/or data store 122 via a communications network (not shown) that can be one or more of, or a combination of, public (e.g., Internet), private (e.g., local area network, wide area network, virtual private network), and can include wireless and wireline transmission systems (e.g., satellite, cellular network, terrestrial networks, etc.). In exemplary embodiments, user devices 120 can include, but are not limited to, a desktop computer, a laptop, a tablet, a smartphone, a wearable device such as a smartwatch, an augmented reality headset, a tablet, a smart television, a computer system such as the one shown in FIG. 9, or any other suitable electronic device. The processing system 100 can store and access data via a connected data store 122. In some embodiments, data store 122 can store a ground truth data made up of a plurality of data points and associated labels for each data point.

According to some embodiments, the model generation engine 106 can build and train predictive models based on a plurality of labeled data inputs (i.e., ground truth data). Vector representation generation engine 108 can generate n-dimensional vector representations of each of the plurality of labeled data inputs relative to a specified model. In other words, while it may be possible to utilize the same set of ground truth data to train different models that perform different functions, the modifications to the ground truth data described herein are made in view of a particular model. Thus, the same set of ground truth data can be optimized in different fashions for different models while creating more accurate models in each instance. Vector representation clustering engine 110 can cluster and/or partition the vector representations using one or more of a clustering algorithm and/or a partitioning algorithm to group and/or separate out vector representations that are similar to one another along the lines of the n-dimensions of the vectors. The ground truth analysis engine 112 can then analyze the clustered/partitioned vector representations to identify anomalous data inputs that have a negative impact on the accuracy of the specified model, such as data inputs that are mislabeled, that contribute to an ambiguous class structure or that are an outlier. The ground truth analysis engine 112 can generate notifications to a user 121 of user device 120 to inform the user 121 of any such anomalous data inputs and the user 121 can (e.g., via an interface of user device 120) then modify the ground truth data by deleting one or more selected data inputs from use in training the model, modifying the labels (e.g. relabel, add a label, delete a label or split a label into more than one label) of one or more selected data inputs following the user's inspection of the data point and its original label, or redefine class structures used with the ground truth data. According to some embodiments, one of more of these corrective actions can be performed automatically by the processing system 100 (e.g., removing outliers from data used for training, relabeling an anomalous data point determined to be mislabeled, etc.) to create an improved set of data inputs and automatically retrain the model using the improved set of data inputs. Aspects of these features of processing system 100 will be described in greater detail below with respect to FIG. 2.

Figure 2:
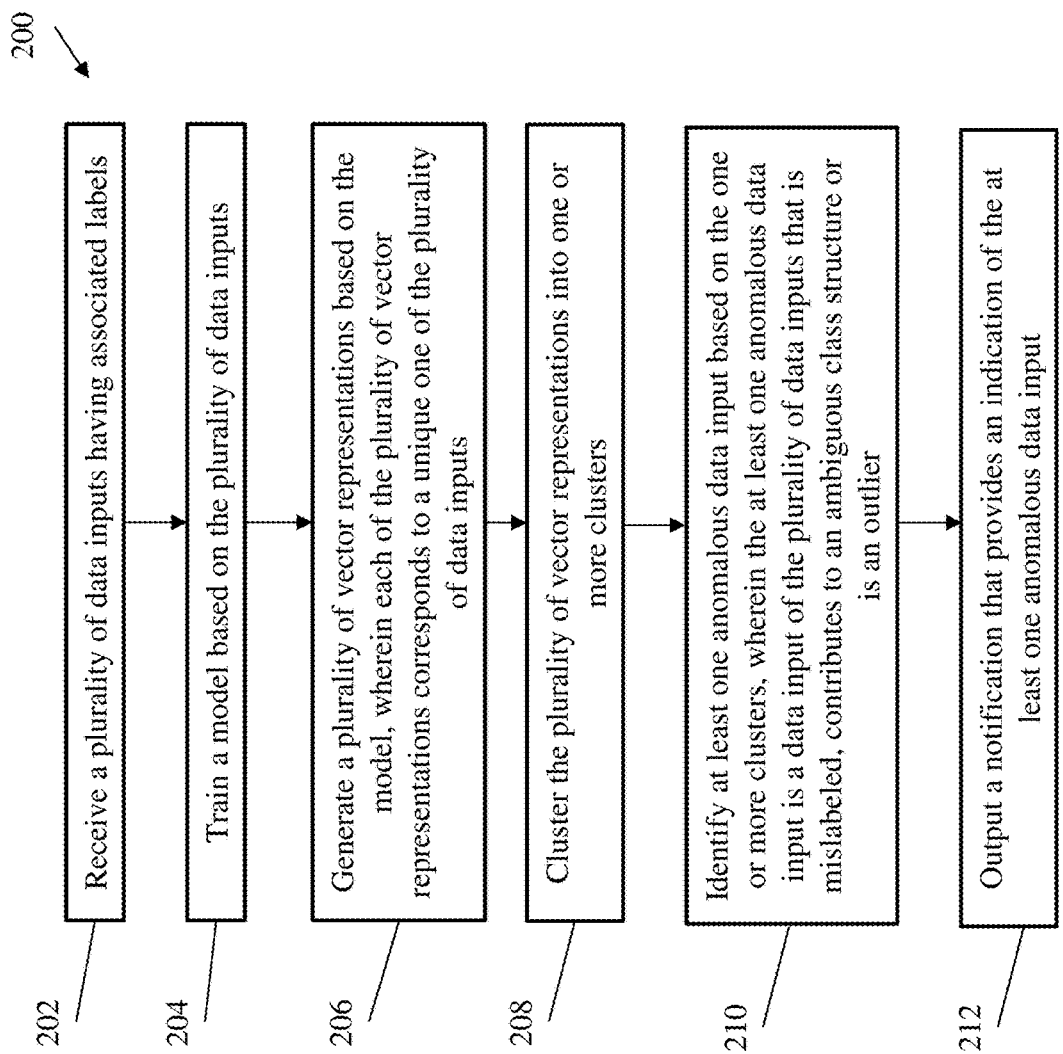
FIG. 2 illustrates a flow diagram of a process for improving ground truth quality for generating accurate machine learning models in accordance with one or more embodiments of the present invention.

Turning now to FIG. 2, a flow diagram of a method 200 for improving ground truth quality for generating accurate machine learning models in accordance with an embodiment is shown. In one or more embodiments of the present invention, the method 200 can be embodied in software that is executed by computer elements located within a network that can reside in the cloud, such as the cloud computing environment 50 described herein above and illustrated in FIGS. 7 and 8. In other embodiments, the computer elements can reside on a computer system or processing system, such as the processing system 100 shown in FIG. 1 or the processing system 900 described herein above and illustrated in FIG. 9, or in some other type of computing or processing environment.

Figure 3:
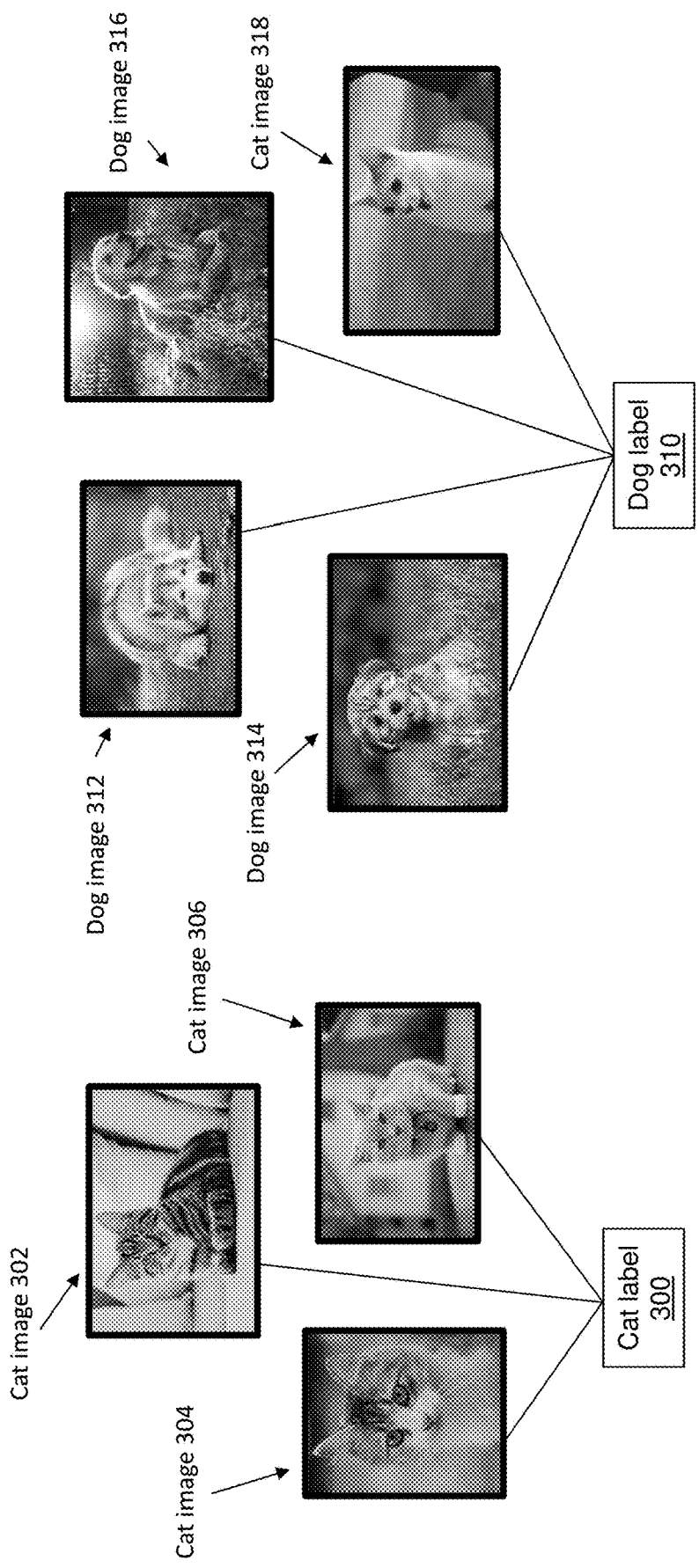
FIG. 3 depicts an example of a plurality of labeled data inputs according to one or more embodiments of the present invention.

The method 200 begins at block 202 and includes receiving (e.g., via processing system 100) a plurality of data inputs. Each of the plurality of data inputs has an associated label. According to some embodiments, each of the plurality of data inputs can be an image, such as the animal images shown in the example ground truth for pet classification task shown in FIG. 3. FIG. 3 shows an example set of ground truth data that includes a first cat image 302, a second cat image 304 and a third cat image 306, each having an associated cat label 300, as well as a first dog image 312, a second dog image 314, a third dog image 316 and a fourth cat image 318, each having an associated dog label 310. As will be understood by those of skill in the art, this example set of ground truth data is problematic because the fourth cat image 318 has been mislabeled with the dog label 310, which will have a negative impact on the accuracy of the model that uses these labeled data inputs to train a model. Thus, it is desirable to analyze ground truth data such as this to identify potential issues with the data and modify or eliminate such instances of problematic data from the data that is used to train the model. Although FIG. 3 shows an example in which the plurality of data inputs are images, it should be understood that the techniques described herein can be applied to other forms of data inputs, such as text, audio (e.g., speech) recordings, observations, records, logs, scans and/or any other type of data that can be coherently translated into an N-dimensional vector that can be used to train a predictive model.

As shown at block 204, the method includes training (e.g., via model generation engine 106) a model based on the plurality of data inputs. As mentioned previously above, the model generation engine 106 can build and train one or more predictive models based on a plurality of labeled data inputs (i.e., ground truth data), such as, for example, the cat/dog images shown in FIG. 3. According to some embodiments, the model generation engine 106 can train a model using supervised machine learning (ML) algorithms, which used methods that take in as inputs labeled data from which relevant features are learned that can then be applied to new unseen data.

Figure 4:
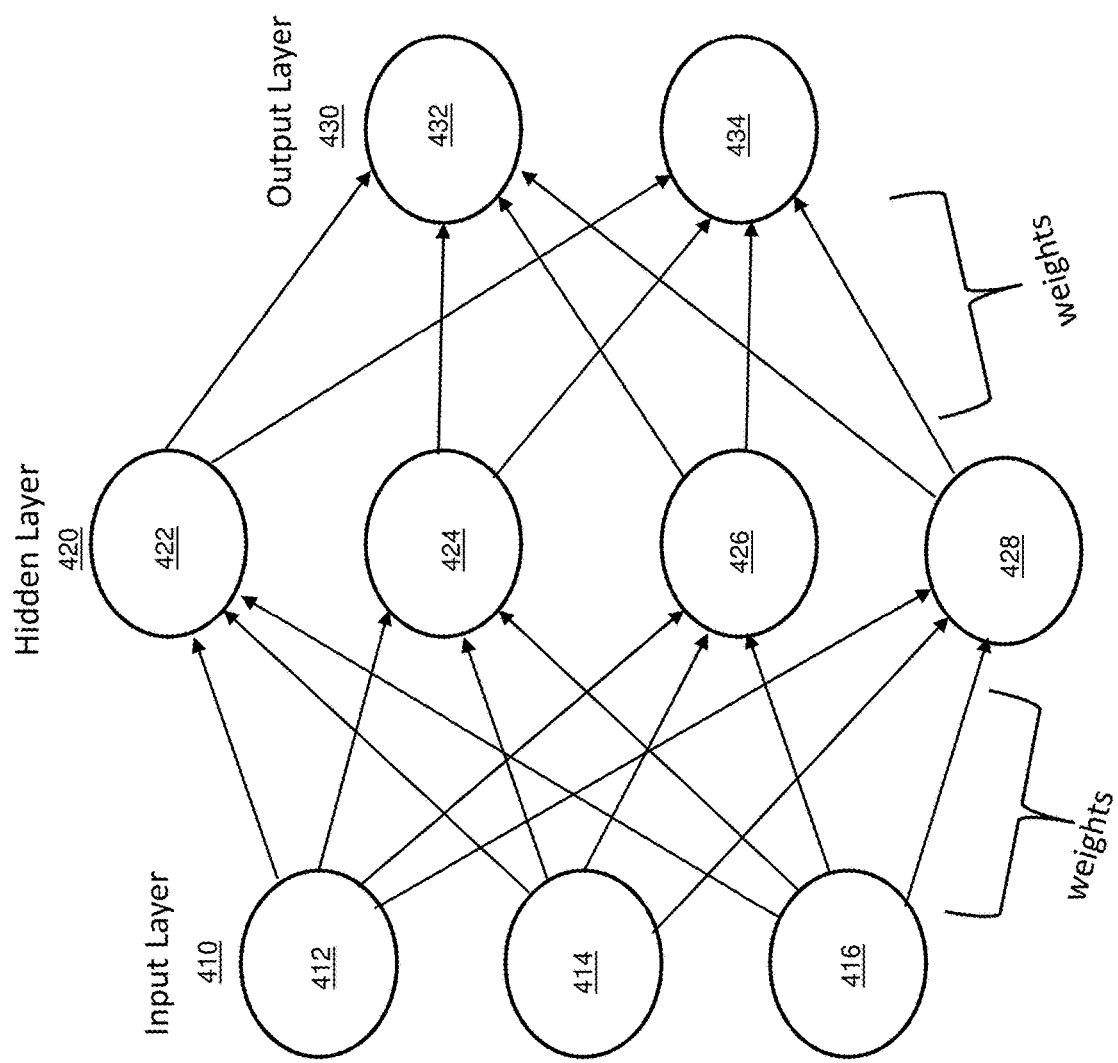
FIG. 4 depicts an example neural network architecture according to an embodiment of the present invention.

According to some embodiments, the model trained by the model generation engine 106 can be a machine learning model that is trained using an artificial neural network (ANN) (which may also simply be referred to as a "neural network"). FIG. 4 depicts a simplified example of a neural network 400. As will be understood by those of skill in the art, neural networks can be used to estimate or approximate systems and functions that depend on a large number of inputs and are generally unknown. Neural networks use a class of algorithms based on a concept of inter-connected "neurons." In a typical neural network, neurons have a given activation function that operates on the inputs. By determining proper connection weights (a process also referred to as "training"), a neural network achieves efficient recognition of a desired patterns, such as images and characters. Oftentimes, these neurons are grouped into "layers" in order to make connections between groups more obvious and to each computation of values. Training the neural network is a computationally intense process.

ANNs are often embodied as so-called "neuromorphic" systems of interconnected processor elements that act as simulated "neurons" and exchange "messages" between each other in the form of electronic signals. Similar to the so-called "plasticity" of synaptic neurotransmitter connections that carry messages between biological neurons, the connections in ANNs that carry electronic messages between simulated neurons are provided with numeric weights that correspond to the strength or weakness of a given connection. The weights can be adjusted and tuned based on experience, making ANNs adaptive to inputs and capable of learning. For example, an ANN for handwriting recognition is defined by a set of input neurons which can be activated by the pixels of an input image. After being weighted and transformed by a function determined by the network's designer, the activations of these input neurons are then passed to other downstream neurons, which are often referred to as "hidden" neurons. This process is repeated until an output neuron is activated. The activated output neuron determines which character was read.

In one or more examples, weight elements are stored in a weight storage element such as a capacitor and read by a weight reader, such as a field effect transistor (FET). Alternatively, or in addition, the weight storage elements can be digital counters (e.g. J-K flip-flop based counters), a memory storage device, or any other electronic circuit that can be used for storing the weight. Here, "weight" refers to a computational value being used during computations of an ANN as described further.

As shown in FIG. 4, a neural network 400 includes an input layer 410, a hidden layer 420, and an output layer 430. Although only one input layer, one hidden layer and one output layer are shown, in practice, an input layer will have many inputs and multiple hidden layers can be provided. The input layer 410 is made up of a plurality of inputs 412, 414, 416, the hidden layer(s) are made up of a plurality of hidden layer neurons 422, 424, 426 and 428, and the output layer is made up of a plurality of output neurons 432, 434 (which may be referred to as the "final layer" or "output layer" of the neural network). It should be understood that a neural network is not limited to the number of neurons shown in the neural network 400 of FIG. 4, which is for illustrative purposes only. As shown by FIG. 4, the neurons of the various layers are interconnected by pathways (or "paths") that each have an associated weight. Prior to training a model, the neural network is initialized by populating all of the weights with pseudo-random values. Generally speaking, each neuron of the hidden layer 420 will also have an associated "bias" value, which may be initially set to zero for each. As will be appreciated by those of skill in the art, as data is input to the neural network via the input layer 410, the data propagated along the paths shown by multiplying the value of the data by the dot product of the weight of the path and then adding the bias of the destination neuron and then passed through an activation function to convert the input signal to an output signal. As will be understood by those of skill in the art, weights can be applied to the inputs and then the activation function can be applied over an aggregate of the weighted inputs. The output layer 430 provides a classification of the data input that can be compared to the associated label of the data input to determine if the classification was correct or incorrect. Following this forward propagation through the neural network, the system performs a backward propagation to update the weight parameters of the paths and the biases of the neurons. These steps can be repeated to train the model by updating the weights and biases until a cost value is met or a predefined number of iterations are run.

According to some embodiments, each data input of the ground truth data can be received by the input layer 410 (e.g., each pixel of an image is received as an input value to an input node 412, 414, 416, etc.) and the values are propagated through the paths of the neural network 400 by applying the activation functions, weights and biases and updating the weights and biases as described above to train the model. Once a predetermined number of iterations are performed or a predetermined amount of the ground truth data (e.g., 80% of the plurality of data inputs) has been input into the neural network, the model may be considered to have been trained and can now be used for its intended purpose. For example, if the model is intended to identify images of cats and dogs, following training of the model with some portion of the ground truth data, new images can be input into the neural network 400 and the neural network can output an identification of the image (e.g., either "cat" or "dog") via the output layer 430 (which may also be referred to as the softmax output layer). According to some embodiments, the values of the final hidden layer 430 (i.e., if there are multiple connected hidden layers 420, the final hidden layer 430 is the layer connected to the output layer 430) can be considered to be an n-dimensional vector representation a given data input (e.g., the image of a cat). The final hidden layer 430 may be referred to as the "final activation layer."

According to some embodiments, the model generation engine 106 can train the model using a classification method, such as a logistic regression or a random forest, which are machine learning algorithms that can map an input to an output based on example input-output pairs (e.g., pairs of data inputs and associated labels). As will be understood by those of skill in the art, a supervised learning algorithm can analyze the training data (i.e., ground truth data) and produce an inferred function that can be used for mapping new examples. Thus, when using a classification method, the trained model can be considered to be the inferred function that is generated based on the training data.

As shown at block 206, the method includes generating (e.g., via vector representation generation engine 108) a plurality of vector representations based on the model. Each of the plurality of vector representations corresponds to a unique one of the plurality of data inputs. In other words, each vector representation in the vector space can be considered to represent one of the plurality of data inputs.

According to some embodiments, if a neural network 400 is used as the model, each of the plurality of vector representations may correspond to a final activation layer of the neural network. In this case, the vector representation generation engine 108 can generate vector representations of each of the plurality of data points by taking the values of the final hidden layer 420 as an n-dimensional vector that represents the data input. For example, after the neural network 400 has been trained, a given data input (e.g., an image) can be input and propagated through the neural network 400, and the values of the final hidden layer 420 following the propagation may be taken as the n-dimensional representation of the data input. As will be understood by those of skill in the art, the final hidden layer 420 captures the learned representation of the example input (i.e., a vector of arbitrary size that represents the salient features learned by the model). In some embodiments, it can be possible to use a vector representation of the example input from the output layer 430, however if the output layer 430 is used then the vector representation would be limited by the number of classifications in the task, which may be too low to represent the example with sufficient fidelity. According to some embodiments, vector representations of a plurality of data inputs can be generated by vector representation generation engine 108 by separating the plurality of data inputs into training data and test data and successively training and testing the data to generate vector representations for each data input of the test data. For example, in some embodiments, the ground truth data may be split into five groups, each representing 20% of the total ground truth data and the model can be trained using 4 groups of data and then used to test and generate vector representations of the remaining group of data. The model can then be further trained using a different set of 4 groups and test and generate vector representations for the remaining $5^{th}$ group of test data, and so on until each combination of 4 groups of data is used to train the model and each $5^{th}$ group is used as test data to generate vector representations of each data input.

According to some embodiments, if a classification method is used as the model, each of the plurality of vector representations can correspond to an n-dimensional classifier probability estimate (i.e., a "confidence vector"). As will be understood by those of skill in the art, many machine learning classification algorithms produce a confidence (i.e., probability) distribution over the set of classes, which is used to make a classification decision. According to some embodiments, a confidence vector has as many dimensions as there are classes in the data. As will be appreciated by those of skill in the art, the generation of a confidence vector in association with a classification model can depend on the model implementation. For instance, a RandomForest generates a confidence vector by examining the distribution of the predictions of its ensemble of decision trees. For example, if an ensemble has 100 decision trees and 90 of the decision trees classify a given example as a dog and 10 of the decision trees classify an example as a cat, then the model has a confidence of 90% that the current example is a dog and the confidence vector would be [0.9, 0.1]. A logistic regression classifier calculates confidence as a vector of signed distances to a learned hyperplane for each class in the classification task. As described previously above, a vector representation can be derived from a neural network by taking the final hidden layer as the vector, however in some embodiments, a the softmax output layer (i.e., output layer 430) could alternatively be used as the confidence vector, although it generally would have lower fidelity than the final hidden layer. In each case, the model is trained, and then a confidence vector representing an example input is calculated from the trained model.

According to some embodiments, vector representation generation engine 108 can create vector representations of each data input using aggregation, which describes the combining of vector representations to derive richer and more comprehensive representations of examples. For example, in some embodiments, the vector representation generation engine 108 can concatenate the raw input vector of an example input with the confidence vector of the same example input derived from the model to obtain a richer representation.

As shown at block 208, the method includes clustering (e.g., via vector representation clustering engine 110) the plurality of vector representations into one or more clusters.

Figure 5B:
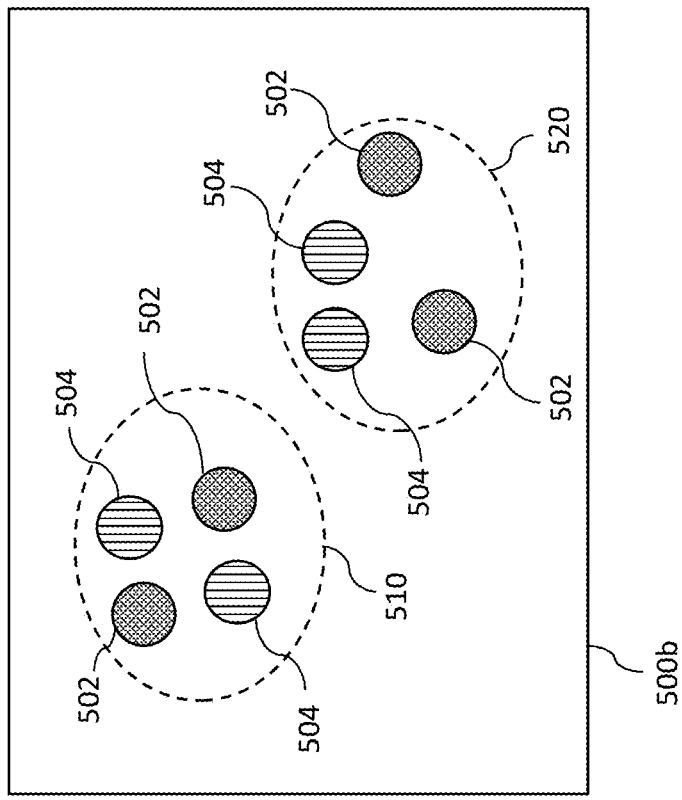
FIG. 5B depicts clustered vector representations of the plurality of labeled data inputs according to another example embodiment of the present invention.
Figure 5A:
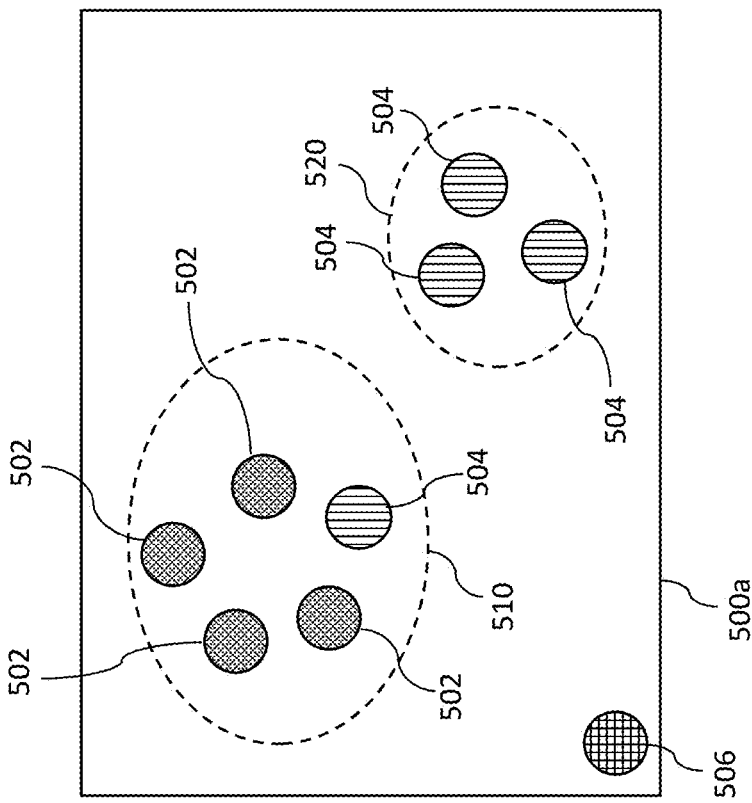
FIG. 5A depicts clustered vector representations of the plurality of labeled data inputs according to an example embodiment of the present invention.

According to some embodiments, the vector representation clustering engine 110 can cluster the vector representations using a density clustering algorithm that clusters the vector representations based on a density that is observed within the vector space. Thus, according to some embodiments, clustering the plurality of vector representations into one or more clusters can include performing a density clustering of the plurality of vector representations. As will be understood by those of skill in the art, a density clustering algorithm can find groups of vector representations (which each represent a data input) that are grouped together, as defined by the clustering algorithm hyperparameters. Hyperparamters are tuning values that can be passed into machine learning algorithms by the user or automatically selected based on heuristics or testing. The hyperparameters control the learning process and behavior of the algorithm in general. With respect to clustering, hyperparameters can be used to control properties of the discovery process. For example, when using hierarchical density-based spatial clustering of applications with noise (HDBSCAN), a hyperparameter can specify a minimum cluster size. According to some embodiments, vector representation clustering engine 110 can cluster the vector representations using, for example, density-based spatial clustering of applications with noise (DBSCAN) or HDBSCAN. FIGS. 5A and FIG. 5B depict examples of vector spaces 500*a*, 500*b*, each having a first cluster 510 of vector representations and a second cluster 520 of vector representations as defined by a clustering algorithm.

Figure 5C:
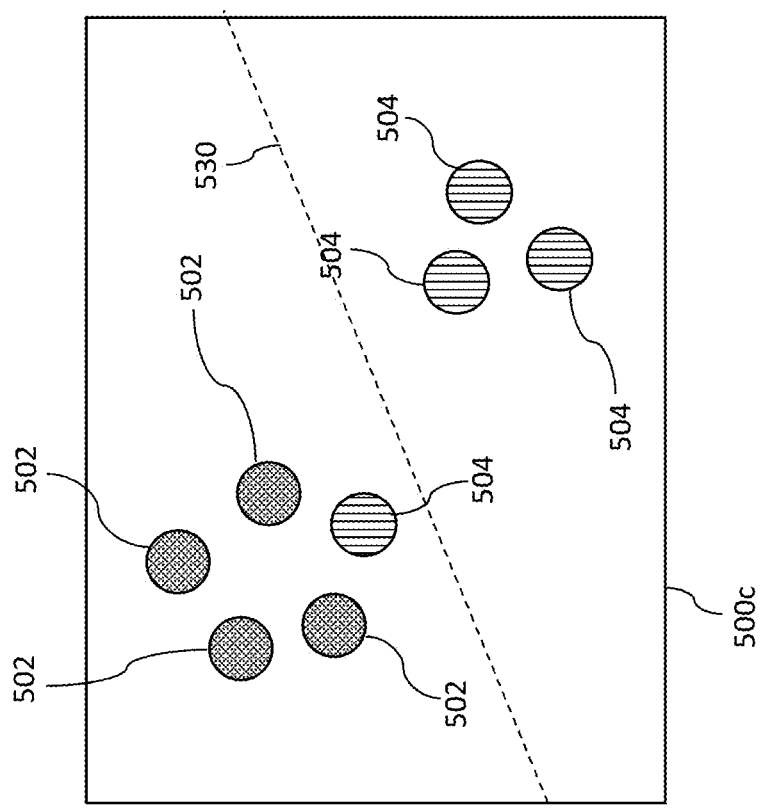
FIG. 5C depicts clustered vector representations of the plurality of labeled data inputs based on partitioning according to another example embodiment of the present invention.

According to some embodiments, vector representation clustering engine 110 can partition the vector space into one or more clusters based on a specified number of clusters. Thus, in some embodiments, clustering the plurality of vector representations into one or more clusters can include performing a partitioning of the plurality of vector representations. For example, if a classification model has specified number of possible classifications (e.g., all images are either "dog" or "cat", therefore there are only two possible classifications), then vector representation clustering engine 110 can partition the vector space into two clusters. For example, FIG. 5C depicts a vector space 500*c* in which vector representation clustering engine 110 has applied a partition 530 to split up the vector space 530 into two separate clusters on either side of the partition. According to some embodiments, vector representation clustering engine 110 can cluster the vector representations by partitioning the vector space into a specified number of partitions using, for example, a k-means clustering algorithm. The specified number of partitions may be equal to a possible number of classifications of the model. In some embodiments, the specified number of partitions can be user input.

Although various examples of clustering and/or partitioning algorithms are described herein, it should be understood that these examples are non-limiting and any known clustering/partitioning algorithm can be used. As will be described in further detail below, a clustered vector spaces can be analyzed by the ground truth analysis engine 112. It will be understood that in various embodiments, vector representation clustering engine 110 can be configured to apply a selected clustering/partitioning algorithm to generate a clustered vector space for analysis, or can separately apply multiple different clustering and/or partitioning algorithms to the plurality of vector representations to generate multiple different instances of the clustered/portioned vector space to be analyzed by the ground truth analysis engine 112.

As shown at block 210, the method includes identifying (e.g., via the ground truth analysis engine 112) at least one anomalous data input based on the one or more clusters. According to some embodiments, the at least one anomalous data input includes a data input of the plurality of data inputs that is mislabeled, contributes to an ambiguous class structure or is an outlier.

According to some embodiments, the ground truth analysis engine 112 can identify one or more mislabeled data inputs by examining clusters that include vector representations of different classification types. For example, as shown in FIG. 5A, the first cluster 510 includes four instances of vector representations having a first type of classification 502 (e.g., "dog") and one instance of a vector representation having a second type of classification 504 (e.g., "cat"), whereas the second cluster 520 includes only vector representations having the second type of classification 504. Data inputs that have the same classification type are expected to be clustered together, as they are expected to have similar aspects that would tend to have n-dimensional vectors that are in the same area of the vector space. Thus, in the case shown in FIG. 5A, the ground truth analysis engine 112 can determine that the vector representation having a second type of classification 504 that is present in the first cluster 510 is anomalous in that it is likely mislabeled. According to some embodiments, the ground truth analysis engine 112 can determine that a given cluster may have one or more vector representations that correspond to mislabeled data inputs if the cluster predominantly includes vector representations having one type of classification, but includes a small minority of vector representations having other types of classifications. According to some embodiments, a cluster may be considered to be of predominantly one type of vector representation if the cluster includes more than a threshold percentage of vector representations of one type of classification, but less than 100%. In varying embodiments, the threshold percentage can be 75%, 80%, 85%, 90%, 95% or any other specified percentage. In some embodiments, the threshold percentage can be based on the total number of vector representations within the cluster. For example, if there are only 4 vector representations in the cluster, then a suitable threshold percentage can be 75%, whereas a cluster with over 1,000 vector representations can have a threshold percentage of 98%. According to some embodiments, in response to identifying one or more mislabeled data inputs, processing system 100 can send a notification to the user 121 (e.g., via user device 120) that identifies the potentially mislabeled data inputs and the user 121 can modify the labels. In some embodiments, the processing system 100 can automatically modify the labels of each mislabeled data input to be the label of the classification type of the predominant vector representations in the cluster and then automatically retrain the model using the new set of ground truth data.

According to some embodiments, the ground truth analysis engine 112 can identify mislabeled data inputs by determining that a given cluster includes two different classification types and determining that the number of vector representations of one classification type is less than a threshold percentage of the number of vector representations of the other classification type. Thus, according to some embodiments, identifying the at least one anomalous data input can include, for each cluster of the one or more clusters: identifying at least a first group of vector representations corresponding to a first classification type and a second group of vector representations corresponding to a second classification type, determining that a total number of vector representations of the second group of vector representations is less than a predetermined percentage of a total number of vector representations in the cluster and determining that each of the second group of vector representations is mislabeled.

According to some embodiments, the ground truth analysis engine 112 can identify one or more data inputs that are outliers by identifying vector representations within a vector space that were not clustered. For example, as shown in FIG. 5A, a vector representation having a third type of classification 506 is positioned on its own outside of the first cluster 510 and the second cluster 520, indicating that it is not similar to any other vector representation in the vector space. It can be desirable to examine outliers such as this to determine if they should be discarded for the purposes of training the model. In some embodiments, the processing system 100 can automatically remove outlier(s) from the ground truth data and retrain the model without them. In some embodiments, a notification provided to the user 121 by the processing system 100 can invite the user to examine the outlier(s) make a determination of whether to remove them from the training data, relabel the data input, create a new classification to account for the outlier or some other suitable action. According to some embodiments, the processing system 100 can generate recommended actions (e.g., remove an outlier from training data, modify the label of a mislabeled data input, etc.) and present the recommendations to the user 121 through a notification in a manner that can allow the user 121 to quickly review the relevant data inputs and accept, reject or modify the recommended change.

According to some embodiments, the ground truth analysis engine 112 can identify one or more data inputs that contribute to an ambiguous class structure by examining the homogeneity of clusters in the vector space to identify clusters having a homogeneity below a predetermined threshold. For example, as shown in FIG. 5B, both the first cluster 510 and the second cluster 520 lack homogeneity because they both contain an equal mix of vector representations having a first type of classification 502 and vector representations having a second type of classification 504, thereby indicating that the classification structure being used to classify the ground truth data is ambiguous. This may occur if, for example, the two original types of classifications are close in nature (e.g., "dog" vs. "wolf"). In such cases, a user may desire to restructure the classifications being used by, for example, combining the two original classes into a new larger class (e.g., "canine") or creating new types of labels that better describe the data (e.g., "adult canine" vs. "adolescent canine"). Thus, in some embodiments, the ground truth analysis engine 112 can analyze the distribution of the number of vector representations having different classification types within the clusters of the vector space and determine that there is a potential issue with the class structures being used one or more clusters have a distribution that is below a threshold level of homogeneity and/or completeness. Completeness can refer to the expected number of vector representations within a cluster. For example, if 100 images are labeled "cat," but a cluster of vector representations corresponding to the "cat" label only includes 90 vector representations with the "cat" label, then the cluster may be considered to only be 90% complete as it is expected that all 100 vector representations would be in the cluster.

Thus, in some embodiments, identifying the at least one anomalous data input can include: for each cluster of the one or more clusters, identifying a first number of vector representations with the cluster that correspond to a first classification type and a second number of vector representations within the cluster that correspond to a second classification type, determining a distribution of vector representations of the first classification type and of the second classification type among the one or more clusters, and responsive to determining that the distribution does not meet a predetermined level of homogeneity, determining that the plurality of data inputs has an ambiguous class structure in relation to the first classification type and the second classification type. In some embodiments, the notification can provide an indication of the ambiguous class structure and the associated data inputs. In some embodiments, a user 121 can examine the identified data inputs and modify the ground truth data by, for example, creating new classifications (i.e., relabeling some or all of the identified data inputs with new labels) or opting to remove identified data from use in training the model. According to some embodiments, the processing system 100 can automatically remove the data inputs associated with the ambiguous class structure(s) and retrain the model.

According to some embodiments, the ground truth analysis engine 112 can analyze a vector space in which a partitioning technique has been applied during the clustering phase to look for ambiguous class structures, as theoretically, if the class structures are appropriate, then the partitions should appropriately separate the vector representations associated with each type of classifications into separate partitions. Thus, based on a partitioned vector space, the ground truth analysis engine 112 can examine the partitions for homogeneity and flag clusters that do not have a threshold level of homogeneity. A threshold of homogeneity can be based on the number of vector representations in a cluster. For example, a cluster with a small number (e.g., 1-100) of vector representations can have a lower threshold than a cluster with a larger number (e.g., more than 1000) of vector representations. Although it should be understood that the threshold of homogeneity can be any percentage that is specified by a user, some examples can be 80%, 85%, 90%, 90%, 95% and 98%. Thus, for example, a cluster with only 5 vector representations can have a threshold of homogeneity of 80%, as a single vector representation with a different label can be more indicative of a mislabeled data input than an ambiguous class structure.

As shown at block 212, the method includes outputting (e.g., via the processing system 100) a notification that provides an indication of the at least one anomalous data input. A notification can be an electronic message that is transmitted to a user device 120 associated with a user 121, which identifies the at least one anomalous data input and the nature of the anomaly (e.g., whether it is potentially mislabeled, an outlier or part of an ambiguous class structure), thereby allowing the user 121 to review the anomalous data inputs, modify labels of selected data inputs, remove selected data inputs from use in training the model, and/or create new types classifications by generating and applying new labels to select data inputs. Upon receiving user inputs reflective of the changes to the ground truth data made in view of the notification, the processing system 100 can retrain the model using the modified ground truth data. According to some embodiments, modification and/or removal from training data of one or more data inputs can be performed automatically by the processing system 100 based on, for example, predetermined rules. Thus, according to some embodiments, the method 200 can further include forming a new plurality of data inputs by removing the at least one anomalous data input from the plurality of data inputs and automatically retraining the model based on the new plurality of data inputs. In some embodiments, the method can include utilizing the retrained model to classify one or more test data inputs. For example, after being retrained, the processing system 100 can receive new test data inputs (e.g., new images) and can utilize the retrained model to classify the new test data inputs. In this way, the method 200 can be used to perform quality control on the ground truth data and generate an improved model having better accuracy by modifying or removing training data as appropriate.

Figure 6:
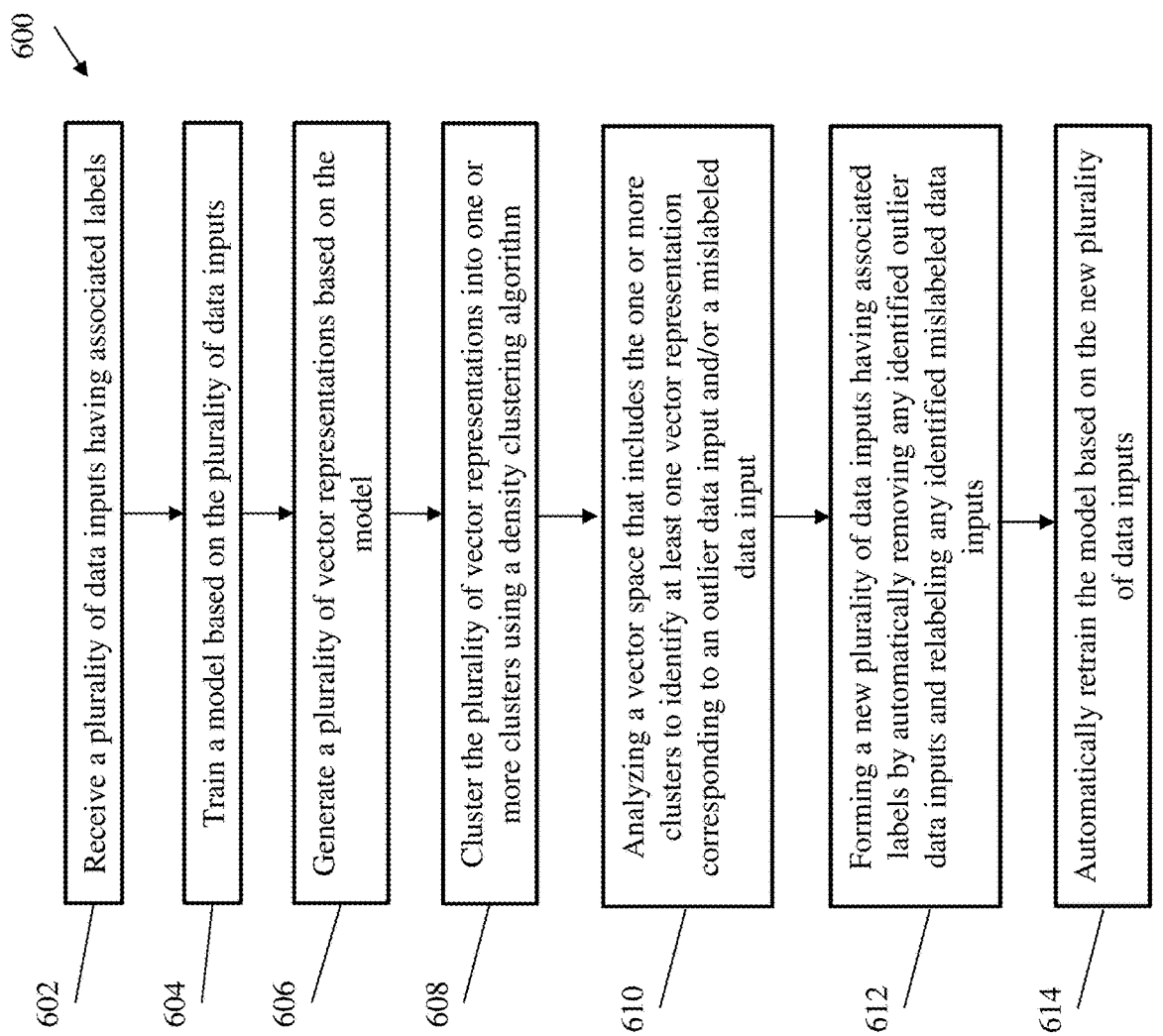
FIG. 6 illustrates a flow diagram of a process for automatically improving ground truth quality for modeling in accordance with one or more embodiments of the present invention.

Turning now to FIG. 6, a flow diagram of a method 600 for automatically improving ground truth quality for modeling in accordance with an embodiment is shown. In one or more embodiments of the present invention, the method 600 can be embodied in software that is executed by computer elements located within a network that can reside in the cloud, such as the cloud computing environment 50 described herein above and illustrated in FIGS. 7 and 8. In other embodiments, the computer elements can reside on a computer system or processing system, such as the processing system 100 shown in FIG. 1 or the processing system 900 described herein above and illustrated in FIG. 9, or in some other type of computing or processing environment.

The method 600 begins at block 602 and includes receiving (e.g., via processing system 100) a plurality of labeled data inputs in a manner similar to that described above with respect to block 202.

As shown at block 604, the method includes training (e.g., via model generation engine 106) a model based on the plurality of data inputs in a manner similar to that described above with respect to block 204.

As shown at block 606, the method includes generating (e.g., via vector representation generation engine 108) a plurality of vector representations based on the model in a manner similar to that described above with respect to block 206.

As shown at block 608, the method includes clustering (e.g., via vector representation clustering engine 110) the plurality of vector representations into one or more clusters using a density clustering algorithm.

As shown at block 610, the method includes analyzing (e.g., via ground truth analysis engine 112) a vector space that includes the one or more clusters to identify at least one vector representation corresponding to an outlier data input and/or a mislabeled data input.

As shown at block 612, the method includes forming (e.g., via processing system 100) a new plurality of data inputs having associated labels by, responsive to identifying an outlier data input, removing the outlier data input from the plurality of data inputs and responsive to identifying a mislabeled data input, relabeling the data input to have an associated label of a classification type of the predominant classification type of the vector representations in the same cluster as the vector representation corresponding to the mislabeled data input.

As shown at block 614, the method includes automatically retraining (e.g., via processing system 100) the model based on the new plurality of data inputs. In this way, the processing system 100 can automatically perform a quality control process on the ground truth data and generate a new, more accurate model.

Additional processes can also be included. It should be understood that the processes depicted in FIGS. 2 and 6 represent illustrations, and that other processes can be added or existing processes can be removed, modified, or rearranged without departing from the scope and spirit of the present disclosure.

Figure 7:
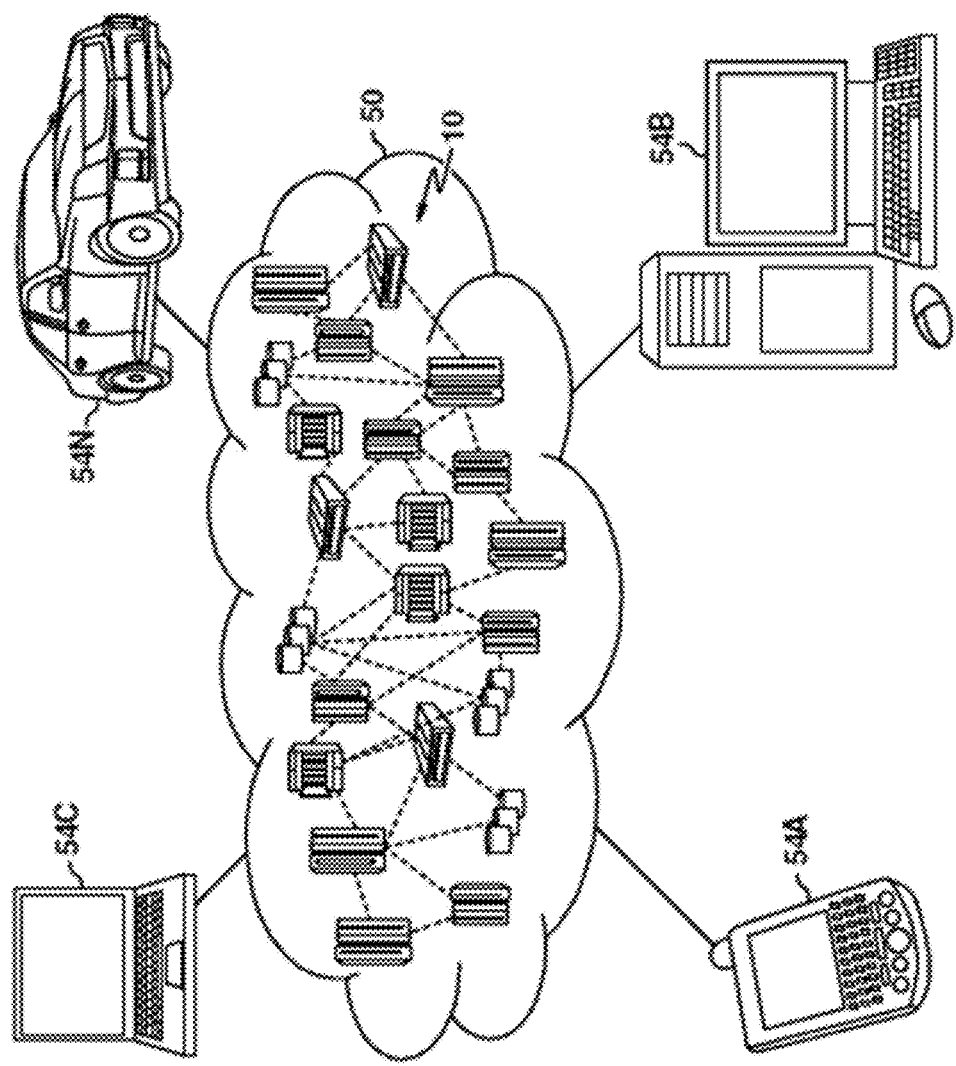
FIG. 7 illustrates a cloud computing environment according to one or more embodiments of the present invention.
Figure 8:
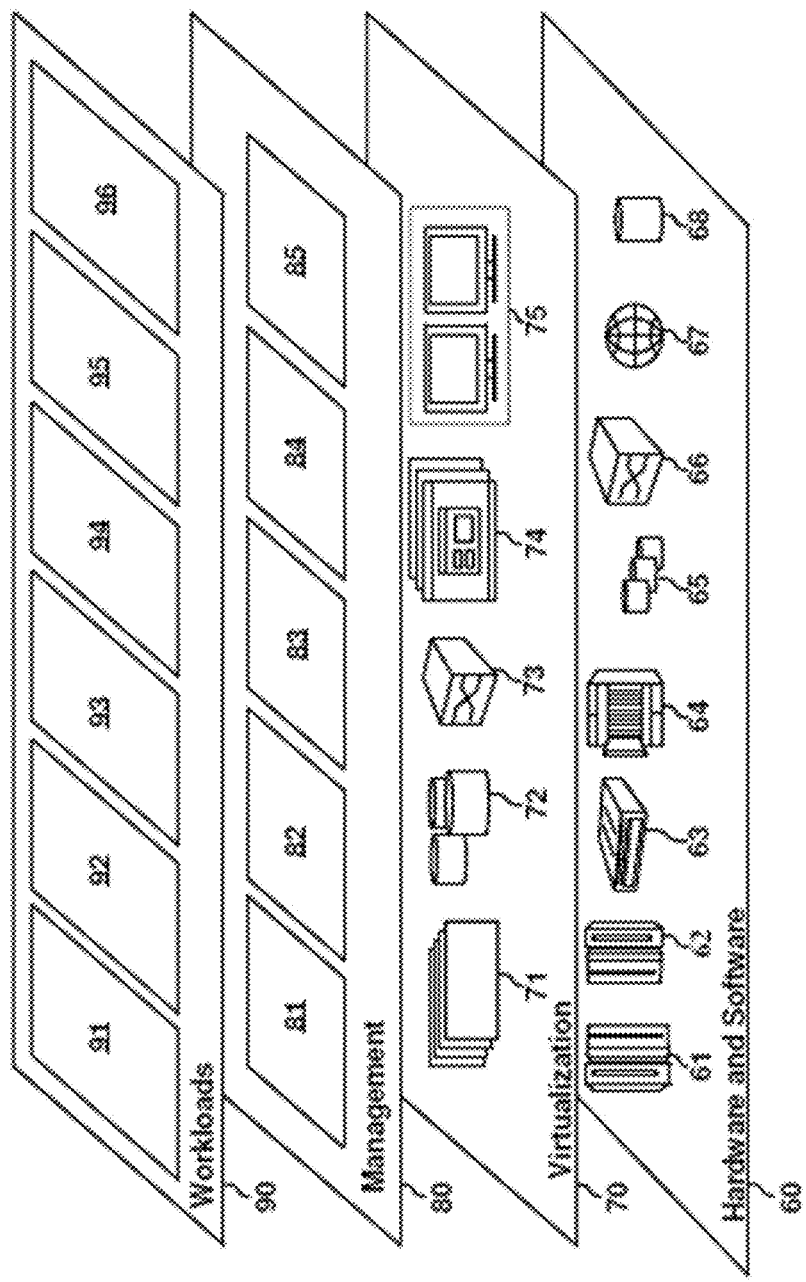
FIG. 8 illustrates abstraction model layers according to one or more embodiments of the present invention.

FIG. 7 depicts a cloud computing environment according to one or more embodiments of the present invention. FIG. 8 depicts abstraction model layers according to one or more embodiments of the present invention.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 7, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 7 are intended to be illustrative only and that computing nodes 10 and cloud computing environment 50 can communicate with any type of computerized device over any type of network and/or network addressable connection (e.g., using a web browser).

Referring now to FIG. 8, a set of functional abstraction layers provided by cloud computing environment 50 (FIG. 7) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and improving ground truth quality for modeling 96.

Figure 9:
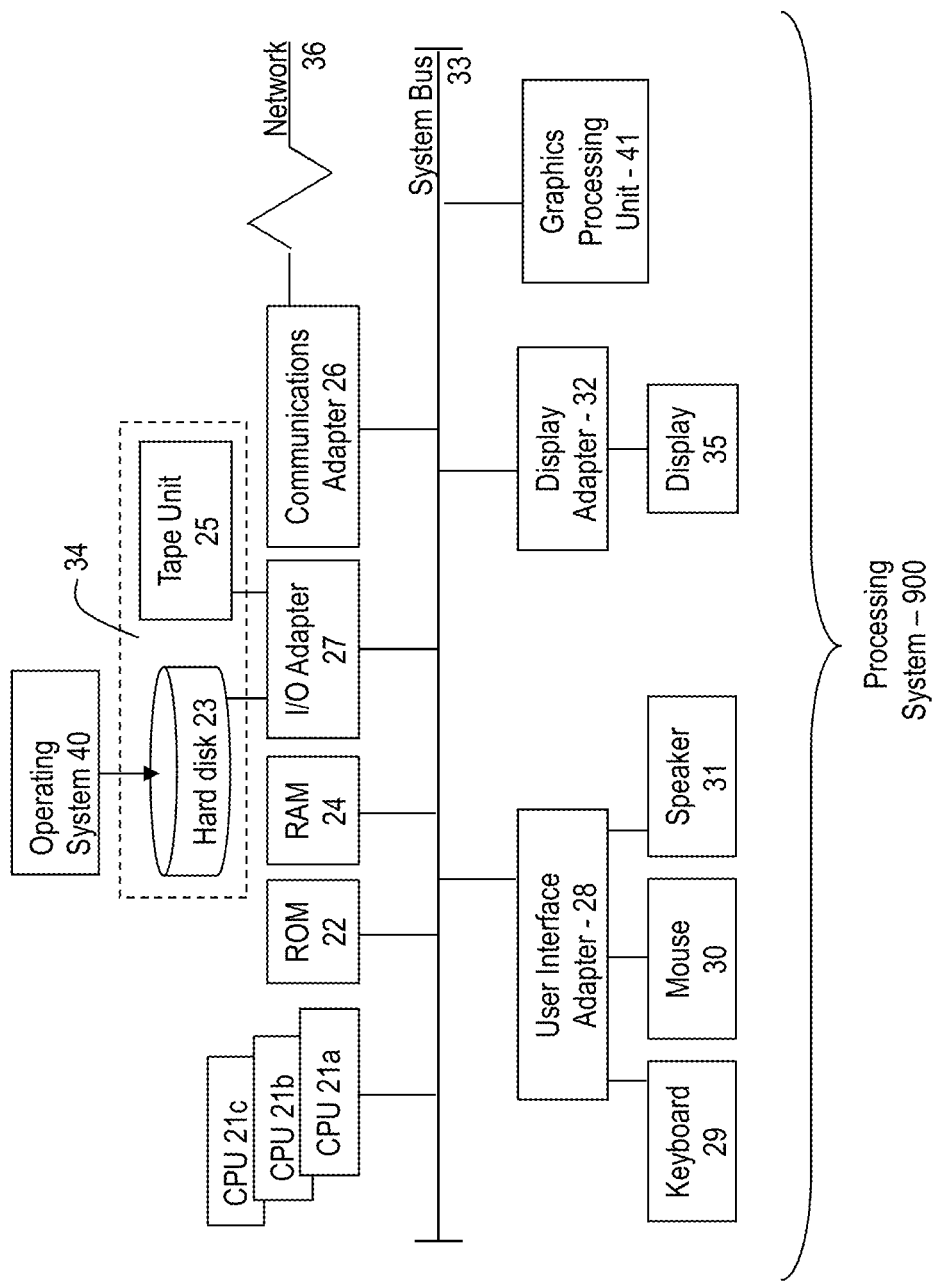
FIG. 9 illustrates a block diagram of a computer system for use in implementing one or more embodiments of the present invention.

FIG. 9 depicts a processing system for implementing one or more embodiments of the present invention;

It is understood that one or more embodiments of the present invention are capable of being implemented in conjunction with any other type of computing environment now known or later developed. For example, FIG. 9 depicts a block diagram of a processing system 900 for implementing the techniques described herein. In accordance with one or more embodiments of the present invention, system 900 is an example of a cloud computing node 10 of FIG. 7. In the embodiment shown in FIG. 9, processing system 900 has one or more central processing units (processors) 21a, 21b, 21c, etc. (collectively or generically referred to as processor(s) 21 and/or as processing device(s)). According to one or more embodiments of the present invention, each processor 21 can include a reduced instruction set computer (RISC) microprocessor. Processors 21 are coupled to system memory (e.g., random access memory (RAM) 24) and various other components via a system bus 33. Read only memory (ROM) 22 is coupled to system bus 33 and can include a basic input/output system (BIOS), which controls certain basic functions of processing system 900.

Further illustrated are an input/output (I/O) adapter 27 and a communications adapter 26 coupled to system bus 33. I/O adapter 27 can be a small computer system interface (SCSI) adapter that communicates with a hard disk 23 and/or a tape storage drive 25 or any other similar component. I/O adapter 27, hard disk 23, and tape storage device 25 are collectively referred to herein as mass storage 34. Operating system 40 for execution on processing system 900 can be stored in mass storage 34. The RAM 24, ROM 22, and mass storage 34 are examples of memory 19 of the processing system 900. A network adapter 26 interconnects system bus 33 with an outside network 36 enabling the processing system 900 to communicate with other such systems.

A display (e.g., a display monitor) 35 is connected to system bus 33 by display adaptor 32, which can include a graphics adapter to improve the performance of graphics intensive applications and a video controller. According to one or more embodiments of the present invention, adapters 26, 27, and/or 32 can be connected to one or more I/O busses that are connected to system bus 33 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 33 via user interface adapter 28 and display adapter 32. A keyboard 29, mouse 30, and speaker 31 can be interconnected to system bus 33 via user interface adapter 28, which can include, for example, a Super I/O chip integrating multiple device adapters into a single integrated circuit.

According to one or more embodiments of the present invention, processing system 900 includes a graphics processing unit 37. Graphics processing unit 37 is a specialized electronic circuit designed to manipulate and alter memory to accelerate the creation of images in a frame buffer intended for output to a display. In general, graphics processing unit 37 is very efficient at manipulating computer graphics and image processing and has a highly parallel structure that makes it more effective than general-purpose CPUs for algorithms where processing of large blocks of data is done in parallel.

Thus, as configured herein, processing system 900 includes processing capability in the form of processors 21, storage capability including system memory (e.g., RAM 24), and mass storage 34, input means such as keyboard 29 and mouse 30, and output capability including speaker 31 and display 35. According to one or more embodiments of the present invention, a portion of system memory (e.g., RAM 24) and mass storage 34 collectively store an operating system such as the AIX® operating system from IBM Corporation to coordinate the functions of the various components shown in processing system 900.

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

One or more of the methods described herein can be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

In some embodiments, various functions or acts can take place at a given location and/or in connection with the operation of one or more apparatuses or systems. In some embodiments, a portion of a given function or act can be performed at a first device or location, and the remainder of the function or act can be performed at one or more additional devices or locations.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The present disclosure has been presented for purposes of illustration and description, but is not intended to be exhaustive or limited to the form disclosed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the disclosure for various embodiments with various modifications as are suited to the particular use contemplated.

The diagrams depicted herein are illustrative. There can be many variations to the diagram or the steps (or operations) described therein without departing from the spirit of the disclosure. For instance, the actions can be performed in a differing order or actions can be added, deleted or modified. Also, the term "coupled" describes having a signal path between two elements and does not imply a direct connection between the elements with no intervening elements/connections therebetween. All of these variations are considered a part of the present disclosure.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method comprising:
   receiving, using a processor, a plurality of data inputs, wherein each of the plurality of data inputs has an associated label;
   training, using the processor, a model based on the plurality of data inputs;
   generating, using the processor, a plurality of vector representations based on the model, wherein each of the plurality of vector representations corresponds to a unique one of the plurality of data inputs;
   clustering, using the processor, the plurality of vector representations into one or more clusters;
   identifying, using the processor based on the one or more clusters, at least one anomalous data input, wherein the at least one anomalous data input comprises a data input of the plurality of data inputs that is mislabeled, contributes to an ambiguous class structure or is an outlier; and
   outputting, using the processor, a notification that provides an indication of the at least one anomalous data input.

2. The computer-implemented method of claim 1, wherein each of the plurality of data inputs comprises an image.

3. The computer-implemented method of claim 1, wherein the model is trained using a neural network and each of the plurality of vector representations corresponds to a final activation layer of the neural network.

4. The computer-implemented method of claim 1, wherein the model is trained using a classification method and each of the plurality of vector representations corresponds to a confidence vector.

5. The computer-implemented method of claim 1, wherein clustering the plurality of vector representations into one or more clusters comprises performing a density clustering of the plurality of vector representations.

6. The computer-implemented method of claim 1, wherein clustering the plurality of vector representations into one or more clusters comprises performing a partitioning of the plurality of vector representations.

7. The computer-implemented method of claim 1, further comprising:
   forming a new plurality of data inputs by removing the at least one anomalous data input from the plurality of data inputs; and
   automatically retraining the model based on the new plurality of data inputs.

8. The computer-implemented method of claim 7 further comprising utilizing the retrained model to classify one or more test data inputs.

9. The computer-implemented method of claim 1, wherein identifying the at least one anomalous data input comprises, for each cluster of the one or more clusters:
   identifying at least a first group of vector representations corresponding to a first classification type and a second group of vector representations corresponding to a second classification type;
   determining that a total number of vector representations of the second group of vector representations is less than a predetermined percentage of a total number of vector representations in the cluster; and
   determining that each of the second group of vector representations is mislabeled.

10. The computer-implemented method of claim 1, wherein identifying the at least one anomalous data input comprises:
    for each cluster of the one or more clusters, identifying a first number of vector representations with the cluster that correspond to a first classification type and a second number of vector representations within the cluster that correspond to a second classification type;
    determining a distribution of vector representations of the first classification type and of the second classification type among the one or more clusters; and
    responsive to determining that the distribution does not meet a predetermined level of homogeneity, determining that the plurality of data inputs has an ambiguous class structure in relation to the first classification type and the second classification type;
    wherein the notification provides an indication of the ambiguous class structure.

11. A system comprising:
    a memory having computer readable instructions; and
    one or more processors for executing the computer readable instructions, the computer readable instructions controlling the one or more processors to perform operations comprising:

receiving a plurality of data inputs, wherein each of the plurality of data inputs has an associated label;

training a model based on the plurality of data inputs;

generating a plurality of vector representations based on the model, wherein each of the plurality of vector representations corresponds to a unique one of the plurality of data inputs;

clustering the plurality of vector representations into one or more clusters;

identifying, based on the one or more clusters, at least one anomalous data input, wherein the at least one anomalous data input comprises a data input of the plurality of data inputs that is mislabeled, contributes to an ambiguous class structure or is an outlier; and outputting a notification that provides an indication of the at least one anomalous data input.

12. The system of claim 11, wherein each of the plurality of data inputs comprises an image.

13. The system of claim 11, wherein the model is trained using a neural network and each of the plurality of vector representations corresponds to a final activation layer of the neural network.

14. The system of claim 11, wherein the model is trained using a classification method and each of the plurality of vector representations corresponds to a confidence vector.

15. The system of claim 11, wherein clustering the plurality of vector representations into one or more clusters comprises performing a density clustering of the plurality of vector representations.

16. The system of claim 11, wherein clustering the plurality of vector representations into one or more clusters comprises performing a partitioning of the plurality of vector representations.

17. A computer program product comprising a computer readable storage medium having program instructions embodied therewith, the program instructions executable by a computer processor to cause the computer processor to perform a method comprising:

receiving a plurality of data inputs, wherein each of the plurality of data inputs has an associated label;

training a model based on the plurality of data inputs;

generating a plurality of vector representations based on the model, wherein each of the plurality of vector representations corresponds to a unique one of the plurality of data inputs;

clustering the plurality of vector representations into one or more clusters;

identifying, based on the one or more clusters, at least one anomalous data input, wherein the at least one anomalous data input comprises a data input of the plurality of data inputs that is mislabeled, contributes to an ambiguous class structure or is an outlier; and outputting a notification that provides an indication of the at least one anomalous data input.

18. The computer program product of claim 17, wherein each of the plurality of data inputs comprises an image.

19. The computer program product of claim 17, wherein the model is trained using a neural network and each of the plurality of vector representations corresponds to a final activation layer of the neural network.

20. The computer program product of claim 17, wherein the model is trained using a classification method and each of the plurality of vector representations corresponds to a confidence vector.

* * * * *